(12) United States Patent
Dausner et al.

(10) Patent No.: US 9,569,135 B2
(45) Date of Patent: *Feb. 14, 2017

(54) VIRTUAL ACCOUNTING CONTAINER FOR SUPPORTING SMALL VOLUMES OF DATA

(71) Applicant: International Business Machines Corporation, Armonk, NY (US)

(72) Inventors: Dietmar Dausner, Boppard (DE);
Itzhack Goldberg, Hadera (IL);
Gerhard H. Pieper, Mainz (DE);
Ovadi Somech, Rishon LeZion (IL);
Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/254,619

(22) Filed: Sep. 1, 2016

(65) Prior Publication Data
US 2016/0371030 A1    Dec. 22, 2016

Related U.S. Application Data

(63) Continuation of application No. 15/197,193, filed on Jun. 29, 2016, which is a continuation of application No. 14/970,675, filed on Dec. 16, 2015, now Pat. No. 9,454,323, which is a continuation of application No. 14/743,155, filed on Jun. 18, 2015.

(51) Int. Cl.
*G06F 3/06* (2006.01)
(52) U.S. Cl.
CPC ........... *G06F 3/0644* (2013.01); *G06F 3/0604* (2013.01); *G06F 3/0689* (2013.01)

(58) Field of Classification Search
CPC ..... G06F 3/0644; G06F 3/0604; G06F 3/0689
See application file for complete search history.

(56) References Cited

U.S. PATENT DOCUMENTS

| | | | |
|---|---|---|---|
| 5,675,769 A * | 10/1997 | Ruff | G06F 3/0607 711/112 |
| 7,058,664 B1 | 6/2006 | Hsu | |
| 7,380,157 B2 | 5/2008 | Brewer et al. | |
| 8,074,020 B2 | 12/2011 | Seaman et al. | |
| 8,312,236 B2 | 11/2012 | Benhase et al. | |
| 8,407,265 B1 | 3/2013 | Scheer et al. | |
| 8,819,092 B2 | 8/2014 | Ludwig et al. | |

(Continued)

OTHER PUBLICATIONS

Harris, Robin; "14 things to know about XIV"; StorageMojo; Nov. 1, 2011; pp. 1-10; <http://storagemojo.com/2011/11/01/14-things-to-know-about-xiv/>.

(Continued)

*Primary Examiner* — Eric S Cardwell
(74) *Attorney, Agent, or Firm* — Walter L. Rudberg

(57) ABSTRACT

Embodiments of the present invention provide a method for storing small volumes of data within a grid-scale storage system. The method includes creating a container within a storage disk. The method includes distributing data evenly between storage disks. A partition is created within the container. Data is received and stored in the partition, wherein the partition is at least as large as the data. The method may also include setting an offset associated with the partition to allow for partition expansion.

1 Claim, 3 Drawing Sheets

(56) References Cited

U.S. PATENT DOCUMENTS

| | | |
|---|---|---|
| 8,850,130 B1 | 9/2014 | Aron et al. |
| 8,909,829 B1 | 12/2014 | Thangapalam et al. |
| 8,954,658 B1 | 2/2015 | Asnaashari et al. |
| 9,454,323 B1 | 9/2016 | Dausner et al. |
| 2009/0006802 A1 | 1/2009 | Lubbers et al. |
| 2014/0164699 A1 | 6/2014 | Resch et al. |
| 2015/0006833 A1* | 1/2015 | Aharon ................ G06F 3/0629 711/162 |

OTHER PUBLICATIONS

Qiao et al.; "SVL: Storage Virtualization Engine Leveraging DBMS Technology"; Proceedings of the 21st International Conference on Data Engineering (ICDE 2005); Apr. 5-8, 2005; pp. 1048-1059; IEEE.

"Enable usage of multiple disks sizes in a GRID storage"; An IP.com Prior Art Database Technical Disclosure; IP.com Number: 000230611; Aug. 26, 2013; pp. 1-3.

"VNX vs. XIV"; The SAN Guy; Printed Apr. 30, 2015; pp. 1-4; <http://thesanguy.com/2013/07/16/vnx-vx-xiv/>.

Dausner et al.; U.S. Appl. No. 14/743,155, filed Jun. 18, 2015, Entitled "Virtual Accounting Container for Supporting Small Volumes of Data".

Dausner et al.; U.S. Appl. No. 15/197,193, filed Jun. 29, 2016, Entitled "Virtual Accounting Container for Supporting Small Volumes of Data".

IBM Appendix P.: "List of IBM Patents or Patent Applications to be Treated as Related", Dated Oct. 11, 2016, 2 pages.

\* cited by examiner

VIRTUAL ACCOUNTING CONTAINER FOR SUPPORTING SMALL VOLUMES OF DATA

BACKGROUND OF THE INVENTION

The present invention relates generally to the field of data storage, and more particularly to supporting small volumes of data on a grid-scale disk storage system.

In computer storage, a logical unit number, or LUN, is a number used to identify a logical unit, which is a device addressed by the Small Computer System Interface (SCSI) protocol or Storage Area Network (SAN) protocols which encapsulate SCSI, such as Fibre Channel or iSCSI. A LUN may be used with any device which supports read/write operations, such as a tape drive, but is most often used to refer to a logical disk as created on a SAN. The term "LUN" is often also used, and will be used throughout this application, to refer to the logical disk itself.

To provide a practical example, a typical multi-disk drive has multiple physical SCSI ports, each with one SCSI target address assigned. An administrator may format the disk array as a redundant array of independent disks (RAID) and then partition this RAID into several separate storage-volumes. To represent each volume, a SCSI target is configured to provide a logical unit. Each SCSI target may provide multiple logical units and thus represent multiple volumes, but this does not mean that those volumes are concatenated. The computer that accesses a volume on the disk array identifies which volume to read or write with the LUN of the associated logical unit. In another example: a single disk-drive has one physical SCSI port. It usually provides just a single target, which in turn usually provides just a single logical unit whose LUN is zero. This logical unit represents the entire storage of the disk drive.

In a grid-scale storage system like IBM XIV Storage System ("XIV"), each LUN is spread across the entire system. XIV uses 180 disks and each LUN occupies at the minimum storage space, which is approximately 17 GB, as at least one 1 MB partition is reserved in each of the 16,411 slices. It should be appreciated that 18 disks is the minimum number of disks for XIV code running on IBM Spectrum Accelerate. It should also be appreciated that 78 disks is the minimum number of disks for XIV code running on XIV hardware.

SUMMARY

A method of storing small volumes of data within a grid-scale storage system, the method comprising: in a grid-scale storage system comprising a plurality of storage disks, creating, by one or more computer processors, a container within a storage disk from the plurality of storage disks, wherein creating a container within the storage disk from the plurality of storage disks comprises: setting, by one or more computer processors, a first offset within the container to be associated with a first created partition; and setting, by one or more computer processors, a second offset within the container to be associated with a second created partition, wherein the second offset is configured to allow the first created partition to be expanded; creating, by one or more computer processors, the first partition within the container, wherein the first partition is identified as a logical unit number (LUN); receiving, by one or more computer processors, a fragment of data; storing, by one or more computer processors, the fragment of data in the first partition, wherein the first partition is at least as large as a size of the fragment of data; recalculating, by one or more computer processors, available storage space in the plurality of storage disks, wherein recalculating available storage space in the plurality of storage disks comprises: calculating offsets for the first and second partitions within the container; and calculating maximum sizes for the first and second partitions within the container.

DETAILED DESCRIPTION

Current slice based storage appliance implementations can allocate volumes in sizes which are multiples of partition size and the number of slices. Therefore, the minimum LUN size can be (1 MB)*(16,411), or approximately 17 GB. This approach is proven to be inefficient in cases in which a great number of small volumes (i.e., volumes which are smaller than the minimum LUN size) should be defined on the storage appliance. The proposed solution enables the system to define small volumes without accounting a full minimum LUN size while guaranteeing minimal slice hammering. The minimal slice hammering is achieved by imitating the layout pattern of a regular volume for a set of smaller volumes. The system relies on the fact that a volume with a size smaller than the minimum LUN size cannot use the same slice more than once. Therefore, layering down a group of small volumes over a regular LUN size will not consume more than the minimum LUN size. Since each small volume offset is carefully set so that it is adjacent to the previous LUN (optionally leaving some room for LUN size increase), we will not have higher slice hammering between all small volumes in a given accounting container to the rest of the volumes in the system than we have in the current implementation.

Figure 1:
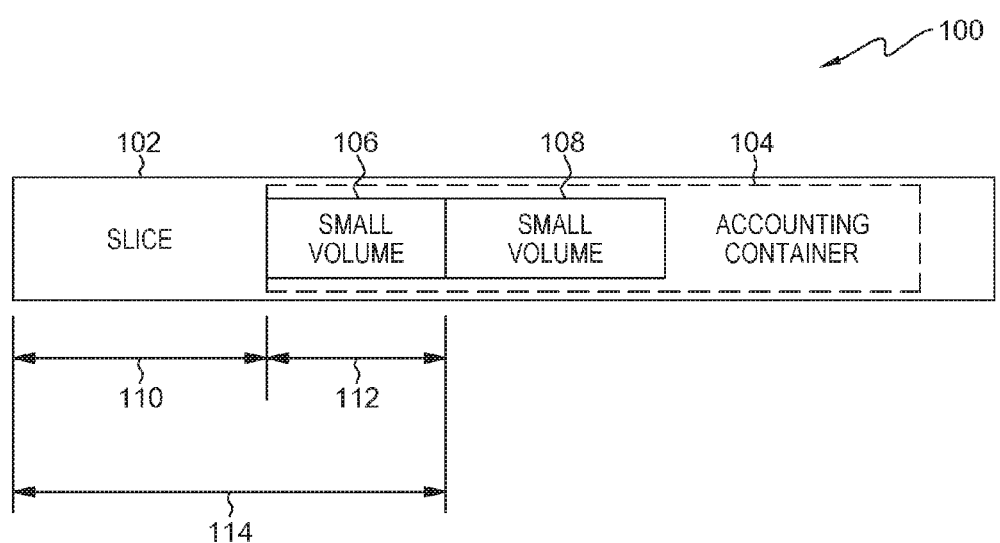
FIG. 1 is a functional block diagram illustrating an environment, in accordance with an embodiment of the present invention.

The present invention will now be described in detail with reference to the figures. FIG. 1 is a functional block diagram illustrating a data storage processing environment ("environment"), generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, environment 100 includes slice 102, accounting container 104, small volume 106, and small volume 108.

A storage system comprising multiple storage devices can configure the storage devices to store a set of multiple storage slices (also referred to herein as slices). Slice 102 is a physical chunk of data that can be stored on a physical disk (a given one of the storage devices) and can be configured to be shared by multiple logical volumes. A slice is comprised of 1 MB partitions and it occupies space on one physical disk (with the present design of XIV). Slices can be migrated from one disk to another when disks are removed from the system or when new disks are added to the system as a system can have a configuration with less number of modules, and as such, less than the maximum 180 disks. Each storage device typically stores multiple slices, and the slices are typically arranged so that sequential slices are stored on different storage devices. In the exemplary embodiment, each slice size is equal to (the maximum number of disks)*(size of each disk)/(16411). For example, if there are 180 disks with each disk being 1 TB in size, each slice size is equal to (180 disks)*(1 TB)/(16411). Similarly, if the disk size is 4 TB then the slice size is (180 disks)*(4 TB)/(16411). A partition in a slice is considered to be used only when it is written to. Therefore, the slice size can increase or decrease if some of the disks are removed (e.g., because they failed) and all slices are distributed (i.e., copied over) to the existing disks.

The storage system may store multiple logical volumes, and may store data for each of the logical volumes on a different slice. Each of the logical volumes can be assigned an offset (also referred to herein as a logical volume offset) indicating a starting slice for the respective logical volume. In operation, when first storing data to a given logical volume having a respective offset, the data is stored to a slice indicated by the respective offset (e.g., if the offset is seven, then the volume starts storing data on the seventh slice in the system). Additionally, the storage system can allocate physical regions (also known as partitions) to the slices on an as-needed basis. In other words, to store logical volume data to a given slice, the storage system may first need to allocate one or more physical regions to the given slice in order to store the data. When allocating one or more physical regions to a given slice, the storage system typically allocates an identical number of physical regions to all slices in the storage system.

Accounting container 104 enables storage administrators to create small volumes in accounting container 104. Accounting container 104 is used to aggregate the accounting of several small volumes that will be accounted as one large volume. In the exemplary embodiment, the size of accounting container 104 will be defined in multiples of the partition size. Accounting container 104 can be resized to be larger or smaller, however, accounting container 104 must be at least as large as the sum of the sizes of the small volumes aggregated in it. For example, accounting container 104 cannot be reduced to a size less than the total volume size within it. Moreover, once accounting container 104 is defined in a pool, its size will be reduced from the pool available soft size, in the same way it is done once a volume is defined in a pool. Pool available soft size is the available storage space.

Accounting container 104 may consist of small volumes, or small LUNs. In the exemplary embodiment, a first small volume 106 and a second small volume 108 are created within accounting container 104. It should be appreciated, however, that the number of small volumes can be greater than or less than two. The creation of small volumes 106 and 108 will not reduce the pool available soft size as a regular volume does. Small volumes 106 and 108 are laid out adjacently using accounting container 104 calculated offset based on the previous small LUN offset. Each small volume offset is equal to the last LUN offset plus that LUN size (in partitions terms) plus optionally added extra space left for future expansion of the same small LUN. This layout enables the appliance to efficiently avoid slice hammering while accounting all small volumes in an accounting container as one volume. Accounting container offset 110 is the distance between the start of slice 102 and the start of accounting container 104. Distance 112 extends between the start of small volume 106 and the end of small volume 106. Distance 114 is the distance between the start of slice 102 and the start of small volume 108. For example, small volume 106 offset is equal to accounting container offset 110. In another example, small volume 108 offset is equal to accounting container offset 110 plus small volume 106 size, (i.e., distance 112), plus accounting container offset 110, (i.e., 114).

A small volume can be reduced in size without limitation (other than fragmentation considerations as discussed below). When increasing the size of a small volume, the system will exclude the small volume from accounting container 104 (i.e., turn it to a standard 17 GB LUN) by reducing the pool soft size by the number of slice size multiples that are required to accommodate the new volume size. An optional optimization can be applied if the small volume is the last defined small volume in the accounting container 104 and accounting container 104 has enough space to allow the small volume to grow within it. In this case, the small volume size can be increased without having to exclude it from accounting container 104. Space can be left for a small LUN expansion by skipping a number of slices when calculating the new LUN offset.

Small volume deletion may cause fragmentation problems in accounting container 104. The fragmentation problem can be addressed in one of the following methods, or by using a combination of the methods. First, using predefined granularity for small volume sizes can potentially ease the use of evacuated offset space. Second, since defragmentation of accounting container 104 is not urgent but is needed for future use of accounting container 104, the system can run a background defragmentation process which will use methods like copy volume. Another possible method is to use a bitmap to track which slice is reserved and which is not for the small LUN within an accounting container.

With regard to small volumes I/O handling, since the small volumes are standard volumes, the I/O handling should not be altered in order to support the new volume scheme. Having a small LUN doesn't change the way a logical block address (LBA) is mapped to its hosting slice, and the calculation is still: Slice Number=LBA %16411, where the "%" is the modulo operator. In computing, the modulo operation finds the remainder after division of one number by another. Thus, given any LBA its modulo (when dividing by 16411) is the slice number. This is contrary to an alternative method where the small LUNs are managed "on the side" as sub-volumes within normal XIV 17 GB granularity LUNs. Thus, the simplicity of this approach leads to easier implementation because it remains compatible with the fundamental current implementation. Similarly, because the small volumes are regular volumes, any volume related storage capabilities, such as mirroring, snapshots, mapping, binding, volume copy, transformation, compression, OLVM, etc. will be supported.

Figure 2:
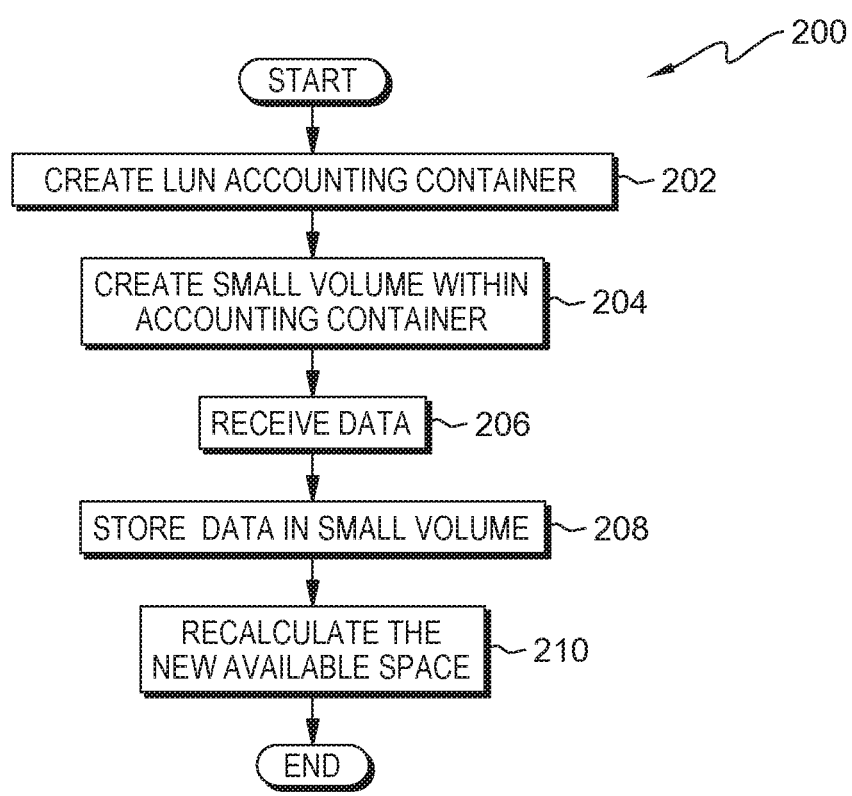
FIG. 2 is a flowchart depicting operational steps for storing several small volumes that will be accounted as one large volume, in accordance with an embodiment of the present invention.

FIG. 2 is a flowchart depicting operational steps of system 200 for storing several small volumes that will be accounted as one large volume, in accordance with an embodiment of the present invention.

In step 202, system 200 creates a LUN accounting container. In the exemplary embodiment, the LUN accounting consists of setting the current LUN offset and the subsequent LUNs' offsets. Thus, the virtual creation of a LUN, in fact the respective accounting of it, is done prior to any data being written to it.

In step 204, system 200 creates a small volume within accounting container 104. This is when the actual space allocation takes place. In this exemplary embodiment, small volume 106 is created in accounting container 104 with a size large enough to store data received (step 206). For example, if the data received in step 206 is 90 MB in size, small volume 106 must be at least 90 MB in size.

In step 206, system 200 receives data. The data is initiated by the host and it can be contained within a single partition (and as such within a single slice which hosts that partition) or if it is bigger than 1 MB then it spans more than one partition and is written to multiple slices.

In step 208, system 200 stores the data in small volume 106.

In step 210, system 200 recalculates the new available space. In this exemplary embodiment, the new available space is calculated to ensure even distribution across all system disks. By tracking the offsets and maximum sizes of small LUNs an even distribution of the data across all disks and slices is ensured. For example, the space calculation is as follows:

Available Space=(Minimum Regular LUN Size)−
(Size of Latest Small LUN[+Extra Room Left
for that Small LUN Expansion]).

Accordingly, by performing the operational steps of FIG. 2, the system allows for support of small LUNs without breaking the simplicity of the grid-scale storage system, which is based on an even distribution of LUNs spread across all disks and slices.

Figure 3:
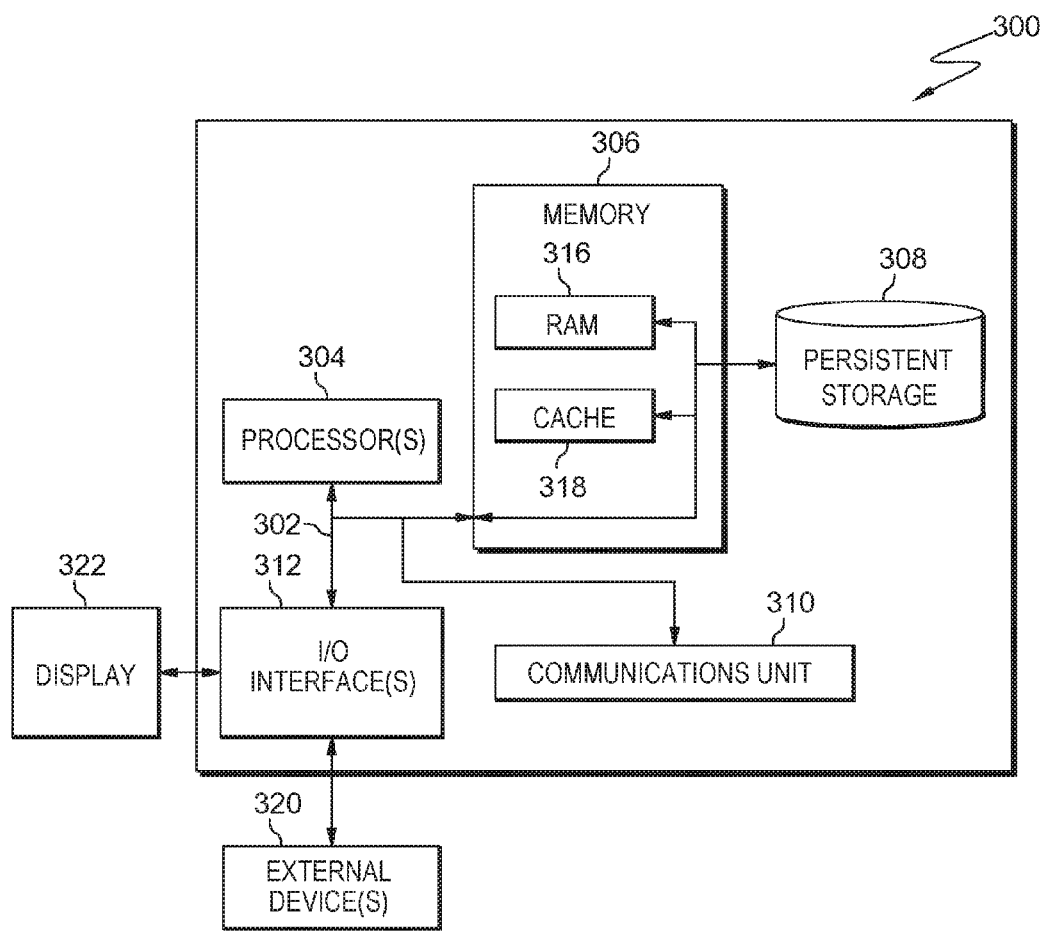
FIG. 3 is a block diagram of internal and external components of a computing device, in accordance with an embodiment of the present invention.

FIG. 3 is a block diagram of internal and external components of computing device 300, which is representative of the computing devices of FIG. 1, in accordance with an embodiment of the present invention. It should be appreciated that FIG. 3 provides only an illustration of one implementation and does not imply any limitations with regard to the environments in which different embodiments may be implemented. In general, the components illustrated in FIG. 3 are representative of any electronic device capable of executing machine-readable program instructions. Examples of computer systems, environments, and/or configurations that may be represented by the components illustrated in FIG. 3 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 300 includes communications fabric 302, which provides for communications between one or more processing units 304, memory 306, persistent storage 308, communications unit 310, and one or more input/output (I/O) interfaces 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 316 and cache memory 318. In general, memory 306 can include any suitable volatile or non-volatile computer readable storage media. Software is stored in persistent storage 308 for execution and/or access by one or more of the respective processors 304 via one or more memories of memory 306.

Persistent storage 308 may include, for example, a plurality of magnetic hard disk drives. Alternatively, or in addition to magnetic hard disk drives, persistent storage 308 can include one or more solid state hard drives, semiconductor storage devices, read-only memories (ROM), erasable programmable read-only memories (EPROM), flash memories, or any other computerreadable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computerreadable storage medium that is also part of persistent storage 308.

Communications unit 310 provides for communications with other computer systems or devices via a network. In this exemplary embodiment, communications unit 310 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 300 through communications unit 310 (i.e., via the Internet, a local area network, or other wide area network). From communications unit 310, the software and data can be loaded onto persistent storage 308.

One or more I/O interfaces 312 allow for input and output of data with other devices that may be connected to computing device 300. For example, I/O interface 312 can provide a connection to one or more external devices 320 such as a keyboard, computer mouse, touch screen, virtual keyboard, touch pad, pointing device, or other human interface devices. External devices 320 can also include portable computerreadable storage media such as, for example, thumb drives, portable optical or magnetic disks, and memory cards. I/O interface 312 also connects to display 322.

Display 322 provides a mechanism to display data to a user and can be, for example, a computer monitor. Display 322 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system comprising:
   one or more computer processors;
   one or more non-transitory computer readable storage media;
   program instructions stored on the one or more non-transitory computer readable storage media for execution by at least one of the one or more processors, the program instructions comprising:
   in a grid-scale storage system comprising 180 storage disks, and 16,411 slices where the 16,411 slices are distributed across the 180 storage disks, program instructions to identify the size of a slice of the 16,411 slices, wherein the slice size is equal to:

(the maximum number of storage disks)*(size of each of the storage disks)/(total number of slices), wherein the maximum number of storage disks is 180, the size of each of the storage disks is 1 TB, and the total number of slices is 16,411;

program instructions to create a container within a slice of the 16,411 slices distributed across the 180 storage disks, wherein creating the container comprises:
  program instructions to set a first offset within said container to be associated with a first created partition; and
  program instructions to set a second offset within said container to be associated with a second created partition, wherein said second offset is configured to allow said first created partition to be expanded;

program instructions to create said first partition within said container, wherein said first partition is identified as a logical unit number (LUN);

program instructions to receive a fragment of data;

program instructions to store said fragment of data in said first partition, wherein said first partition is at least as large as a size of the fragment of data;

responsive to storing the fragment of data, program instructions to recalculate an updated amount of available storage space in the 180 storage disks, wherein the updated amount of available storage space in the 180 storage disks is equal to:

(a minimum LUN size)−(a size of the LUN+storage space of said second offset configured to allow said first created partition to be expanded), wherein the program instructions to recalculate the updated amount of available storage space comprise:
  program instructions to calculate offsets for the first and second partitions within said container; and
  program instructions to calculate maximum sizes for the first and second partitions within said container; and wherein the program instructions to recalculate the updated amount of available storage space comprise program instructions to maintain an even distribution of a set of data across the plurality of storage disks and the first and the second partitions.

\* \* \* \* \*